US009679508B2

(12) United States Patent
Park et al.

(10) Patent No.: US 9,679,508 B2
(45) Date of Patent: Jun. 13, 2017

(54) DISPLAY PANEL AND REPAIR METHOD THEREOF

(71) Applicant: SAMSUNG DISPLAY CO., LTD., Yongin-si, Gyeonggi-do (KR)

(72) Inventors: Kyong Tae Park, Yongin-si (KR); Tae Gon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/192,950

(22) Filed: Jun. 24, 2016

(65) Prior Publication Data

US 2016/0379535 A1 Dec. 29, 2016

(30) Foreign Application Priority Data

Jun. 29, 2015 (KR) ........................ 10-2015-0092519

(51) Int. Cl.

| | |
|---|---|
| ***G06F 3/038*** | (2013.01) |
| ***G09G 3/00*** | (2006.01) |
| ***G09G 3/3266*** | (2016.01) |
| ***G09G 3/3275*** | (2016.01) |

(52) U.S. Cl.

CPC ........... *G09G 3/006* (2013.01); *G09G 3/3266* (2013.01); *G09G 3/3275* (2013.01); *G09G 2310/08* (2013.01); *G09G 2330/12* (2013.01)

(58) Field of Classification Search

CPC .... G09G 3/006; G09G 3/3266; G09G 3/3275; G09G 2310/08; G09G 2330/12; G09G 3/20; G09G 3/3225; G09G 3/3233; G09G 3/3241; G09G 2230/00; G09G 2300/0413; G09G 2300/0426; G09G 2300/0819; G09G 2300/0852; G09G 2300/0861; G09G 2330/08; G09G 2330/10; G02F 1/136259; H01L 27/3223; H01L 27/3276

See application file for complete search history.

(56) References Cited

U.S. PATENT DOCUMENTS

| | | | |
|---|---|---|---|
| 2014/0292623 | A1 | 10/2014 | Moon et al. |
| 2014/0292827 | A1 | 10/2014 | Kang et al. |
| 2014/0313106 | A1 | 10/2014 | In et al. |

FOREIGN PATENT DOCUMENTS

| | | | |
|---|---|---|---|
| KR | 10-0666639 | B1 | 1/2007 |
| KR | 10-2014-0119584 | A | 10/2014 |
| KR | 10-2014-0120167 | A | 10/2014 |
| KR | 10-2014-0126110 | A | 10/2014 |

*Primary Examiner* — Nelson Rosario

(74) *Attorney, Agent, or Firm* — Lewis Roca Rothgerber Christie LLP

(57) ABSTRACT

A display panel includes scan lines, data lines, organic light emitting diodes, pixel circuits configured to supply drive currents, and electrically coupled to the scan lines and the data lines, repair pixel circuits configured to generate repair drive currents when there is a malfunctioning pixel circuit, repair lines, and repair data lines, wherein a corresponding repair pixel circuit corresponds to the malfunctioning pixel circuit, and is configured to generate the repair drive current based on a repair data voltage from a corresponding repair data line, wherein the repair drive current is configured to be supplied to a corresponding organic light emitting diode that corresponds to the malfunctioning pixel circuit through a corresponding repair line that corresponds to the malfunctioning pixel circuit, and wherein a portion of the repair data lines that extends in the first direction is longer than a portion that does not extend in the first direction.

19 Claims, 11 Drawing Sheets

DISPLAY PANEL AND REPAIR METHOD THEREOF

CROSS-REFERENCE TO RELATED APPLICATION

This application claims priority to, and the benefit of, Korean Patent Application No. 10-2015-0092519, filed on Jun. 29, 2015, in the Korean Intellectual Property Office, the entire contents of which are incorporated herein by reference in their entirety.

BACKGROUND

1. Field

Exemplary embodiments of the present disclosure relate to a display panel and a repair method thereof.

2. Description of the Related Art

Recently, various display devices, which have reduced weight and volume when compared to a cathode ray tube, have been developed. Such display devices include a liquid crystal display device, a field emission display device, a plasma display panel, an organic light emitting display device and the like.

Recently, research on large-sized organic light emitting display device has been made. Much research is in progress to increase yield of a manufacturing process of a large-sized organic light emitting display device, and also research is in progress to differently overcome problems associated with organic light emitting display devices, even if the yield is low.

SUMMARY

An exemplary embodiment of the present disclosure provides a display panel in which a repair data voltage is supplied to a repair pixel circuit through a line that extends in a horizontal direction, and a repair method thereof.

In addition, the exemplary embodiment provides a display panel in which a load is reduced by shorting repair lines according to a repair data voltage, which is supplied to repair pixel circuits through lines extending in the horizontal direction, even if the display panel is an organic light emitting diode display, and a repair method thereof.

According to an embodiment of the present disclosure, a display panel may include a plurality of scan lines extending in a first direction, a plurality of data lines extending in a second direction that crosses the first direction, a plurality of organic light emitting diodes, a plurality of pixel circuits respectively corresponding to the plurality of organic light emitting diodes, configured to respectively supply drive currents, and respectively electrically coupled to the plurality of scan lines and the plurality of data lines, a plurality of repair pixel circuits configured to generate repair drive currents when there is a malfunctioning pixel circuit among the plurality of pixel circuits, a plurality of repair lines, and a plurality of repair data lines, wherein a corresponding repair pixel circuit of the repair pixel circuits corresponds to the malfunctioning pixel circuit, and is configured to generate the repair drive current based on a repair data voltage from a corresponding repair data line of the plurality of repair data lines that corresponds to the malfunctioning pixel circuit, wherein the repair drive current is configured to be supplied to a corresponding organic light emitting diode of the plurality of organic light emitting diodes that corresponds to the malfunctioning pixel circuit through a corresponding repair line of the plurality of repair lines that corresponds to the malfunctioning pixel circuit, and wherein a length of a portion of the plurality of repair data lines that extends in the first direction is greater than a length of a portion that does not extend in the first direction.

The malfunctioning pixel circuit may be electrically decoupled from the corresponding organic light emitting diode, the corresponding repair data line may be electrically coupled to a corresponding data line of the plurality of data lines that corresponds to the malfunctioning pixel circuit, the corresponding repair pixel circuit may be configured to receive the repair data voltage, the corresponding repair line may be electrically coupled to the corresponding organic light emitting diode, and the repair drive current may be configured to be supplied to the corresponding organic light emitting diode.

Each of the repair lines may generally extend in the first direction, and may further include an extension portion extending in the second direction, when there is a cut data line of the plurality of data lines, extension portions of two adjacent coupling repair lines of the plurality of repair lines may be electrically coupled to a respective one of two cut portions of the cut data line, and a voltage supplied to either of the two cut portions may also be supplied to the other of the two cut portions through the two adjacent coupling repair lines.

Each of the repair data lines may generally extend in the first direction, and may further include an extension portion extending in the second direction, when there is a cut data line among the plurality of data lines, extension portions of two adjacent coupling repair data lines of the data lines may be electrically coupled to a respective one of two cut portions of the cut data line, and a voltage supplied to either of the two cut portions may also be supplied to the other of the two cut portions through the two adjacent coupling repair data lines.

The plurality of repair data lines may include a plurality of repair lines, each repair pixel circuit may further include a repair coupling line, and the corresponding repair data line may be adjacent the corresponding repair line in the second direction.

The corresponding repair data line may be electrically coupled to a corresponding data line of the data lines that corresponds to the malfunctioning pixel circuit, the corresponding repair line may be electrically coupled to a corresponding repair coupling line of the repair coupling lines that corresponds to the corresponding repair pixel circuit, the corresponding repair pixel circuit may be configured to receive the repair data voltage, the malfunctioning pixel circuit may be electrically decoupled from the corresponding organic light emitting diode, and the corresponding repair line may be electrically coupled to the corresponding organic light emitting diode.

Each of the repair lines may generally extend in the first direction, and may further include an extension portion extending in the second direction, when there is a cut data line among the plurality of data lines, extension portions of two adjacent coupling repair lines among the repair lines may be electrically coupled to a respective one of two cut portions of the cut data line, and a voltage that is supplied to either of the two cut portions may also be supplied to the other of the two cut portions via the two adjacent coupling repair lines.

The plurality of repair data lines may include a plurality of repair lines, each repair pixel circuit may further include a first repair coupling line and a second repair coupling line, and the corresponding repair data line may be a first adjacent repair line that is adjacent the corresponding repair line in the second direction, or may be a second adjacent repair line that is adjacent the corresponding repair line in a direction that is opposite to the second direction.

When a first adjacent pixel among the plurality of pixels that is adjacent the malfunctioning pixel circuit in the second direction malfunctions, the corresponding repair data line may be the second adjacent repair line, and when a second adjacent pixel among the plurality of pixels that is adjacent the malfunctioning pixel circuit in a direction that is opposite to the second direction malfunctions, the corresponding repair data line may be the first adjacent repair line.

The first adjacent repair line or the second adjacent repair line may be electrically coupled to a corresponding data line of the data lines that corresponds to the malfunctioning pixel circuit, the first adjacent repair line or the second adjacent repair line may be electrically coupled to a first repair coupling line or a second repair coupling line of the corresponding repair pixel circuit, the corresponding repair pixel circuit may be configured to receive the repair data voltage, the malfunctioning pixel circuit may be electrically decoupled from the corresponding organic light emitting diode, the corresponding repair line may be electrically coupled to the corresponding organic light emitting diode, and the repair drive current may be configured to be supplied to the corresponding organic light emitting diode.

Each of the repair lines may generally extend in the first direction, and may further include an extension portion extending in the second direction, when there is a cut data line among the plurality of data lines, extension portions of two adjacent coupling repair lines may be electrically coupled to a respective one of two cut portions of the cut data line, and a voltage supplied to either of the two cut portions may also be configured to be supplied to the other of the two cut portions via the coupling repair lines.

The plurality of repair data lines may include the plurality of repair lines, each repair pixel circuit may further include a repair coupling line, the corresponding repair data line may be a separately disposed repair line among the plurality of repair lines that is separated from the corresponding repair line in the second direction, and at least one repair line of the repair lines may be between the corresponding repair line and the separately disposed repair line.

The separately disposed repair line may be electrically coupled to a corresponding data line of the data lines that corresponds to the malfunctioning pixel circuit, the separately disposed repair line may be electrically coupled to the repair coupling line of the corresponding repair pixel circuit, the corresponding repair pixel circuit may be configured to receive the repair data voltage, the malfunctioning pixel circuit may be electrically decoupled from the corresponding organic light emitting diode, the corresponding repair line may be electrically coupled to the corresponding organic light emitting diode, and the repair drive current may be configured to be supplied to the corresponding organic light emitting diode.

Each of the repair lines may further include an extension portion extending in the second direction, when there is a cut data line among the plurality of data lies, extension portions of two adjacent corresponding repair lines may be electrically coupled to a respective one of two cut portions of the cut data line, and a voltage that is supplied to either of the two cut portions may also be configured to be supplied to the other of the two cut portions via the coupling repair lines.

Another embodiment of the present disclosure has an aspect of a method of repairing a malfunctioning pixel circuit in a display panel. According to the embodiment, there is provided a repair method of a display panel including a plurality of scan lines extending in a first direction, a plurality of data lines extending in a second direction that crosses the first direction, a plurality of organic light emitting diodes, a plurality of pixel circuits that respectively correspond to the plurality of organic light emitting diodes, that are configured to respectively supply drive currents, and that are respectively electrically coupled to the plurality of scan lines and the plurality of data lines, a plurality of repair pixel circuits configured to generate repair drive currents when there is a malfunctioning pixel circuit among the plurality of pixel circuits, and a plurality of repair lines which extend in the first direction, the method including electrically decoupling the malfunctioning pixel circuit from a corresponding organic light emitting diode among the plurality of organic light emitting diodes that corresponds to the malfunctioning pixel circuit, supplying a repair data voltage to a corresponding repair pixel circuit among the plurality of repair pixel circuits that corresponds to the malfunctioning pixel circuit, generating a repair drive current based on the repair data voltage, and supplying the repair drive current to the corresponding organic light emitting diode through a corresponding repair line among the plurality of repair lines that corresponds to the malfunctioning pixel circuit.

The display panel may further include a plurality of repair data lines respectively electrically coupled to the plurality of repair pixel circuits, and, during supplying of the repair data voltage to the corresponding repair pixel circuit, a corresponding repair data line may be electrically coupled to the corresponding repair pixel circuit and is electrically coupled to a corresponding data line among the plurality of data lines that corresponds to the malfunctioning pixel circuit.

During supplying the repair data voltage to the corresponding repair pixel circuit, one of the repair lines other than the corresponding repair line among the plurality of repair lines may be electrically coupled to a corresponding data line among the plurality of data lines that corresponds to the malfunctioning pixel circuit.

During supplying the repair data voltage to the corresponding repair pixel circuit when a pixel adjacent the malfunctioning pixel circuit in the second direction malfunctions, a repair line adjacent to the corresponding repair line in a direction opposite to the second direction may be electrically coupled to the corresponding data line, and when a pixel adjacent the malfunctioning pixel circuit in the direction opposite to the second direction malfunctions, a repair data line adjacent the corresponding repair line in the second direction may be electrically coupled to the corresponding data line.

Yet another embodiment of the present disclosure has another aspect of a method of repairing a data line which is cut in a display panel. According to the embodiment, there is provided a repair method of a display panel including a plurality of scan lines extending in a first direction, a plurality of data lines extending in a second direction crossing the first direction, a plurality of organic light emitting diodes, a plurality of pixel circuits that respectively correspond to the plurality of organic light emitting diodes, that are configured to respectively supply drive currents, and that are electrically coupled to the plurality of data lines, a plurality of repair pixel circuits that are configured to generate repair drive currents when there is a malfunctioning pixel circuit among the plurality of pixel circuits, and a plurality of repair lines extending in the first direction, the method including respectively electrically coupling two adjacent coupling repair lines among the plurality of repair lines to a respective one of two cut portions of a cut data line among the plurality of data lines.

BRIEF DESCRIPTION OF THE DRAWINGS

Example embodiments will now be described more fully hereinafter with reference to the accompanying drawings, in which.

DETAILED DESCRIPTION

Figure 1:
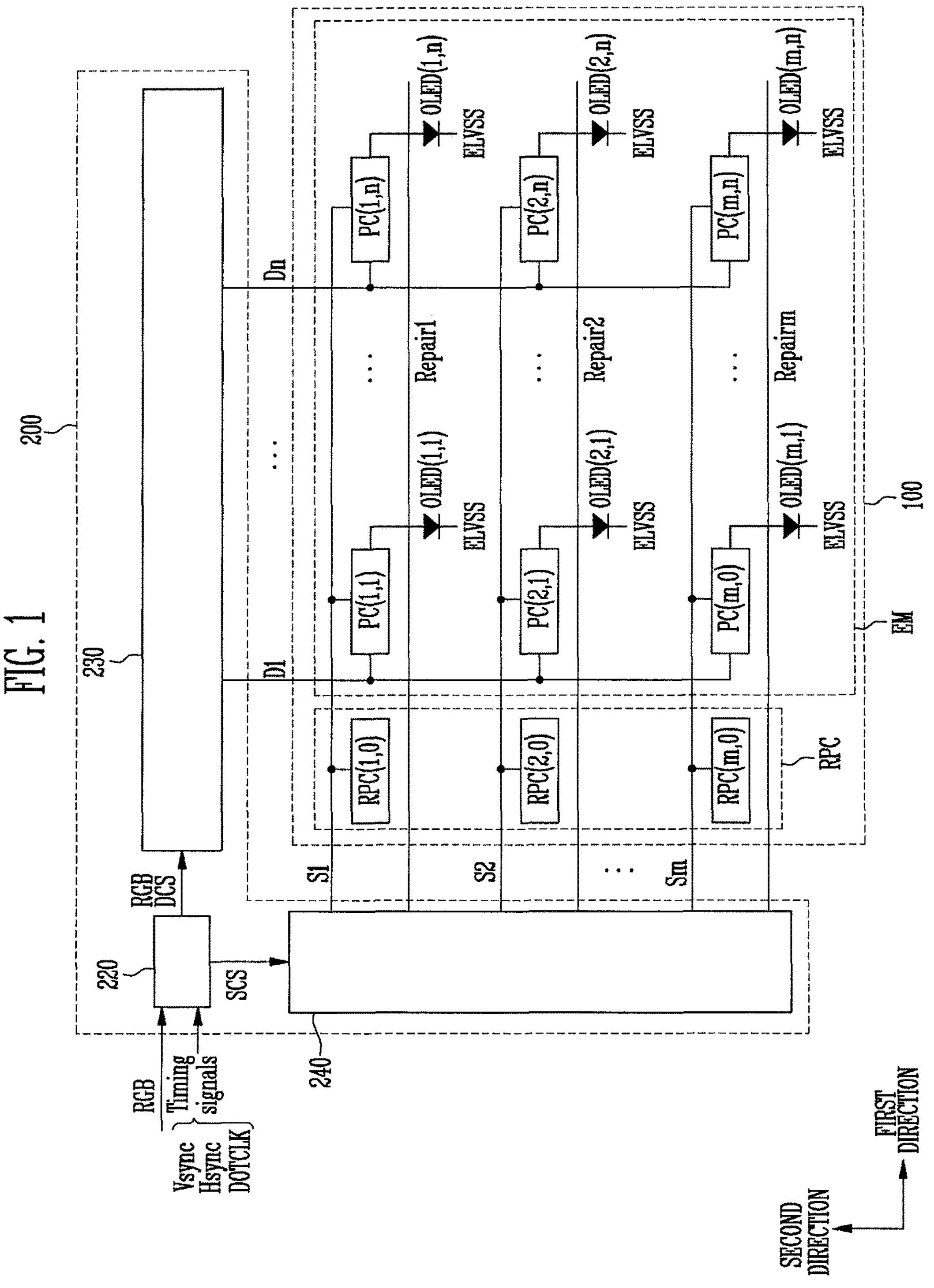
FIG. 1 illustrates a display panel according to an embodiment of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention."

As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 illustrates a display panel according to an embodiment of the present disclosure.

The display panel 100 according to the present embodiment is driven by a display panel drive unit 200.

The display panel 100 includes scan lines (S1 to Sm, m being an integer equal to or larger than 3), data lines (D1 to Dn, n being an integer equal to or larger than 2), organic light emitting diodes (OLED(1,1) to OLED(m,n), hereinafter, referred to as OLED), pixel circuits (PC(1,1) to PC(m,n), hereinafter, referred to as PC), repair pixel circuits (RPC(1,0) to RPC (m,0), hereinafter, referred to as RPC), and repair lines (Repair1 to Repairm, hereinafter, referred to as Repair).

One electrode (for example, a cathode electrode) of each of the organic light emitting diodes OLED is electrically coupled to a second power supply ELVSS, and the other electrode (for example, an anode electrode) is electrically coupled to a corresponding pixel circuit PC.

The pixel circuits PC respectively correspond to the organic light emitting diodes OLED, are configured to supply drive currents to the corresponding organic light emitting diodes OLED, and are electrically coupled to the scan lines (S1 to Sm, hereinafter, referred to as S) extending in a first direction, and electrically coupled to the data lines (D1 to Dn, hereinafter, referred to as D) extending in a second direction.

The pixel circuit (PC(a, b), a being a natural number equal to or smaller than m, b being a natural number equal to or smaller than n) is electrically coupled to the scan line Sa and the data line Db.

The pixel circuit PC(a, b) receives a data voltage, which is supplied to the data line Db, while a scan signal is supplied to the scan line Sa, and a level of the drive current that is supplied by the pixel circuit PC(a,b) is determined on the basis of a level of the data voltage that is supplied to the data line Db.

For the sake of convenience, the display panel 100 can be divided into a light emitting region EM and a region of repair pixel circuits RPC.

First power supply lines, through which a first power supply voltage is typically supplied, are omitted, and repair data lines may be additionally formed in the display panel 100 according to the present embodiment.

Hereinafter, the first direction may be horizontal, and the second direction may be vertical, although this is just an example for the sake of description.

The display panel drive unit 200 generates and supplies data voltages to the data lines D, and generates and supplies the scan signals to the scan lines S, thereby driving the display panel 100.

In the present embodiment, the display panel drive unit 200 includes a timing controller 220, a data drive unit 230, and a scan drive unit 240. The timing controller 220, the data drive unit 230 and the scan drive unit 240 may be realized as individual electronic devices, or the entire display panel drive unit 200 may be realized as one electronic device (for example, a display driver IC or the like).

The timing controller 220 receives externally supplied image signals RGB and timing signals Timing signals. The timing signals "Timing signals" include a vertical synchronization signal Vsync, a horizontal synchronization signal Hsync, and dot clocks DOTCLK. The timing controller 220 generates timing control signals DCS and SCS to control timing of the operation of the data drive unit 230 and the scan drive unit 240, based on the received timing signals Timing signals.

The data drive unit 230 latches image signals RGB, which are input to the data drive unit 230 from the timing controller 220, in response to the data timing control signal DCS. The data drive unit 230 includes a plurality of source drive ICs, and the source drive ICs may be electrically coupled to the data lines D of the display panel 100 through a chip on glass (COG) process or a tape automated bonding (TAB) process.

The scan drive unit 240 sequentially supplies the scan lines S with the scan signals in response to the scan timing control signal SCS. The scan drive unit 240 may be directly formed on a substrate of the display panel 100 using a gate In panel (GIP) method, or may be electrically coupled to the scan lines S of the display panel 100 using the TAB method.

Figure 2:
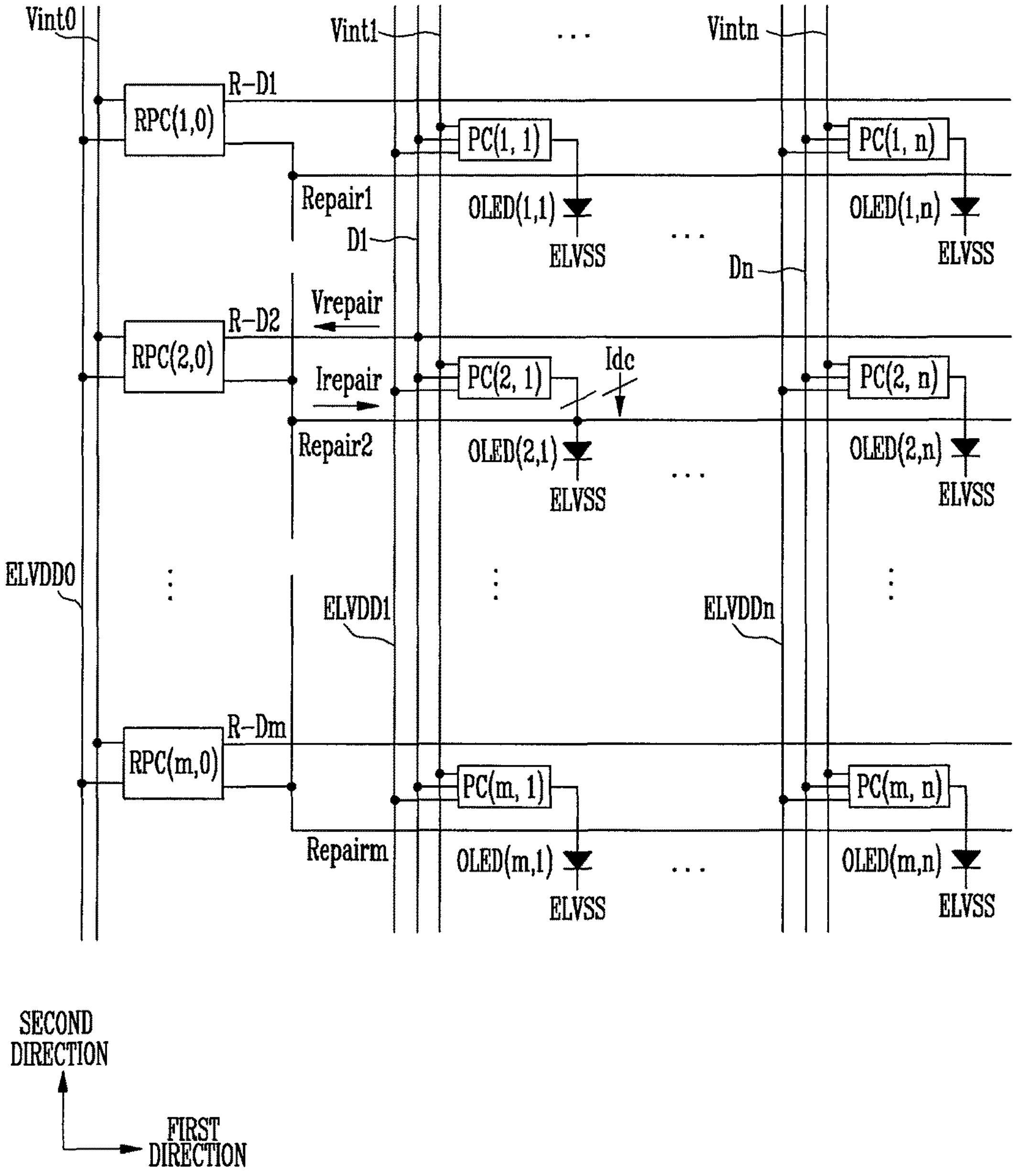
FIG. 2 illustrates a case in which one of pixels malfunctions in an embodiment of a display of FIG. 1.

FIG. 2 illustrates a case in which one of the pixels malfunctions in an embodiment of the display of FIG. 1.

Figure 3:
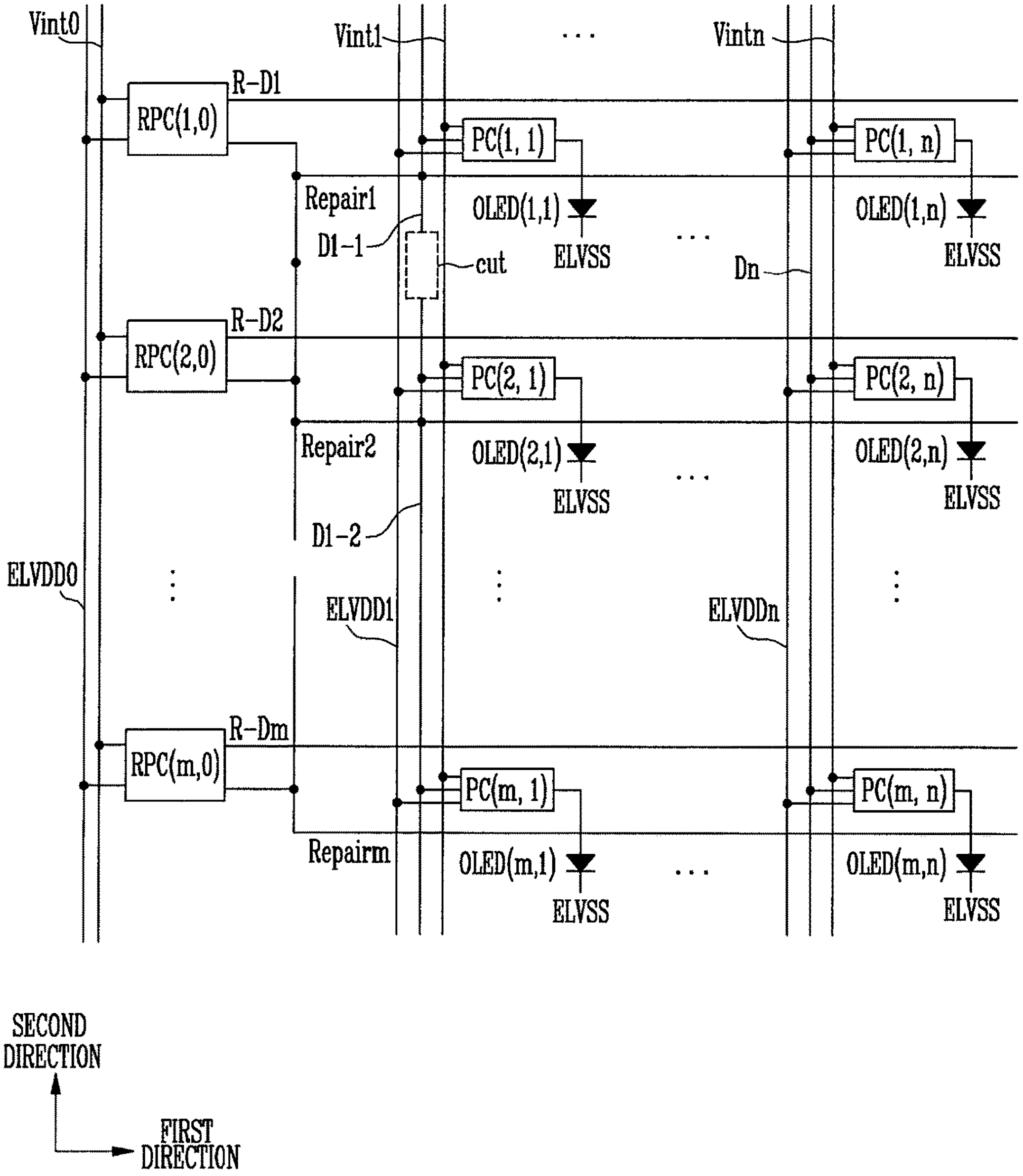
FIG. 3 illustrates a case in which one of data lines is cut in the embodiment of the display of FIG. 1.

In the embodiments illustrated in FIG. 2 and FIG. 3, repair data lines R-D1 to R-Dm extending in the first direction are additionally formed, and the repair lines Repair1 to Repairm include extension portions that extend in the second direction.

For the sake of convenient description, it is assumed that all of the data lines D are not cut, and it is assumed that the pixel circuit PC(2,1) malfunctions. Thus, a repair pixel circuit RPC(2,0) (hereinafter, referred to as a corresponding repair pixel circuit) corresponds to the malfunctioning pixel circuit PC(2,1), and is among the repair pixel circuits RPC(1,0) to RPC(m,0). Further, a repair data line R-D2 (hereinafter, referred to as a corresponding repair data line) corresponds to the malfunctioning pixel circuit PC(2,1), and is among the repair data lines R-D1 to R-Dm. The repair data lines R-D1 to R-Dm respectively correspond to the repair pixel circuits RPC(1,0) to RPC(m,0).

In addition, a repair line Repair2 (hereinafter, referred to as a corresponding repair line) corresponds to the malfunctioning pixel circuit PC(2,1), and is among the repair lines Repair1 to Repairm. An organic light emitting diode OLED (2,1) (hereinafter, referred to as a corresponding organic light emitting diode) corresponds to the malfunctioning pixel circuit PC(2,1), and is among the organic light emitting diodes OLED. Additionally, a data line D1 (hereinafter, referred to as a corresponding data line) corresponds to the malfunctioning pixel circuit PC(2,1), and is among the data lines D.

The malfunctioning pixel circuit PC(2,1) is electrically decoupled from the corresponding organic light emitting diode OLED(2,1), and therefore drive current Idc does not flow from the pixel circuit PC(2,1) to the organic light emitting diode OLED(2,1). That is, the malfunctioning pixel circuit PC(2,1) might not generate the drive current Idc.

The repair data line R-D2 is electrically coupled to the data line D1 through a process, such as laser short, and thereby the repair pixel circuit RPC(2,0) receives a repair data voltage Vrepair, which corresponds to a data voltage that is supplied to the data line D1.

The repair pixel circuit RPC(2,0) generates a repair drive current Irepair, the repair line Repair2 is electrically coupled to the corresponding organic light emitting diode OLED(2, 1), and thereby the repair drive current Irepair is supplied to the corresponding organic light emitting diode OLED(2,1). Here, a level of the repair drive current Irepair is determined based on a level of the data voltage, which is supplied to the data line D1. That is, even if the pixel circuit PC(2,1) malfunctions, the organic light emitting diode OLED(2,1) receives the repair drive current Irepair from the repair pixel circuit RPC(2,0), and is thereby able to emit light, due to respective electrical coupling and electrical decoupling.

While referring to FIG. 2, electrical decoupling, supplying of the repair data voltage Vrepair, and generating and supplying the repair drive current Irepair are sequentially described, although this description is just an example.

FIG. 3 illustrates a case in which one of the data lines is cut in the embodiment of the display of FIG. 1.

For the sake of convenient description, it may be assumed that all of the pixel circuits PC normally operate, and only the data line D1 of the data lines D is cut. In addition, it may be assumed that a cut portion Cut is formed between two repair lines Repair1 and Repair2, and the data line D1 therefore includes a first portion D1-1 and a second portion D1-2, which are cut/electrically separated from each other.

Thus, repair lines that are coupled to each other are the repair line Repair1 and the repair line Repair2. An extension portion of the repair line Repair1 is electrically coupled to an extension portion of the repair line Repair2. The repair line Repair1 is electrically coupled to the first portion D1-1 of the data line D1, and the repair line Repair2 is electrically coupled to the second portion D1-2 of the data line D1. Electrical coupling may be made through a process such as laser short.

According to the electrical coupling, the data voltage, which is supplied from the first portion D1-1, is supplied to the second portion D1-2 through the repair lines Repair1 and Repair2. That is, even in the presence of the cut portion Cut, the data voltage may be supplied to an entirety of the data line D1 through the repair lines Repair1 and Repair2.

Figure 4:
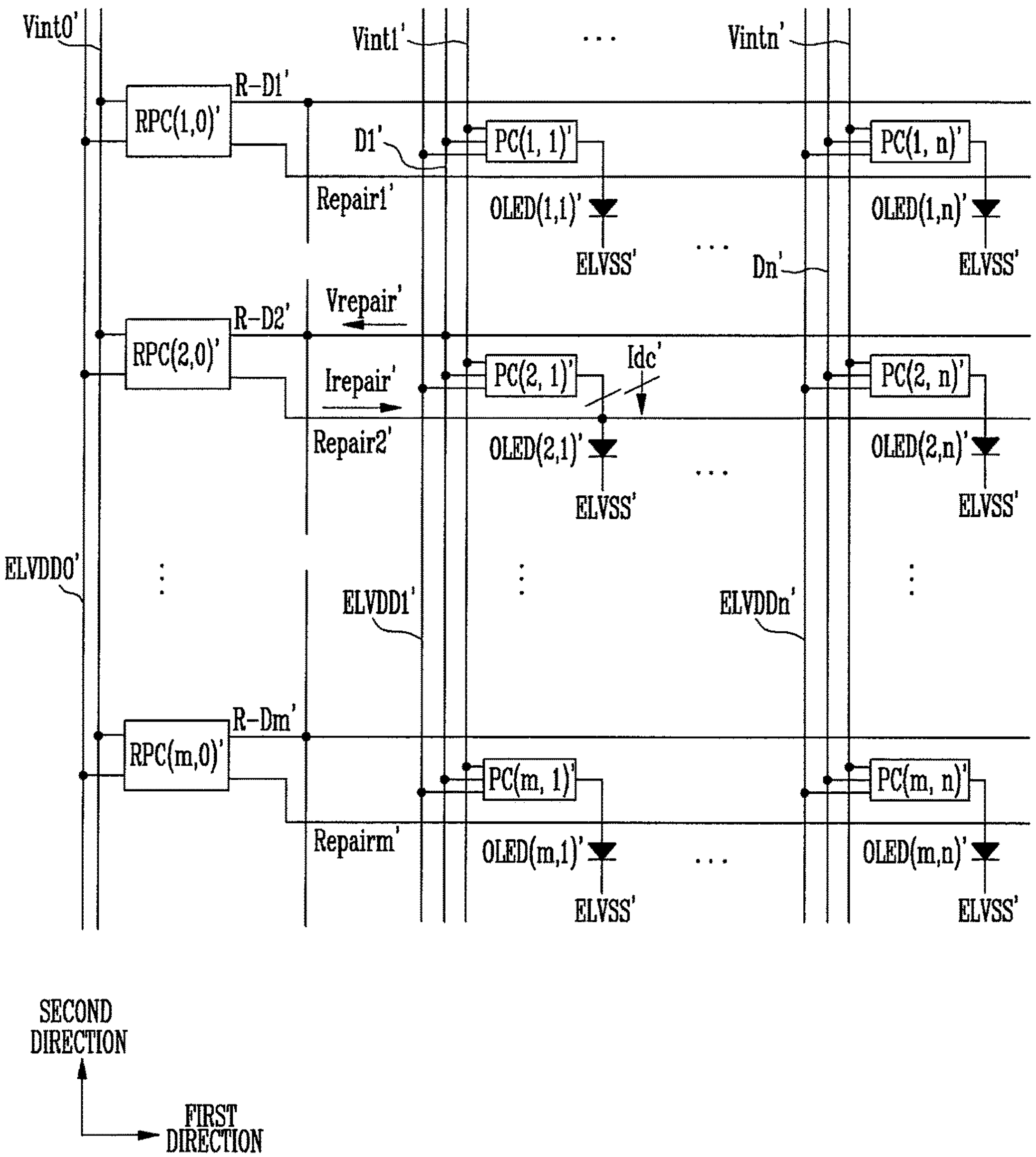
FIG. 4 illustrates a case in which one of pixels malfunctions in another embodiment of the display of FIG. 1.

FIG. 4 illustrates a case in which one of the pixels malfunctions in another embodiment of the display of FIG. 1.

Figure 5:
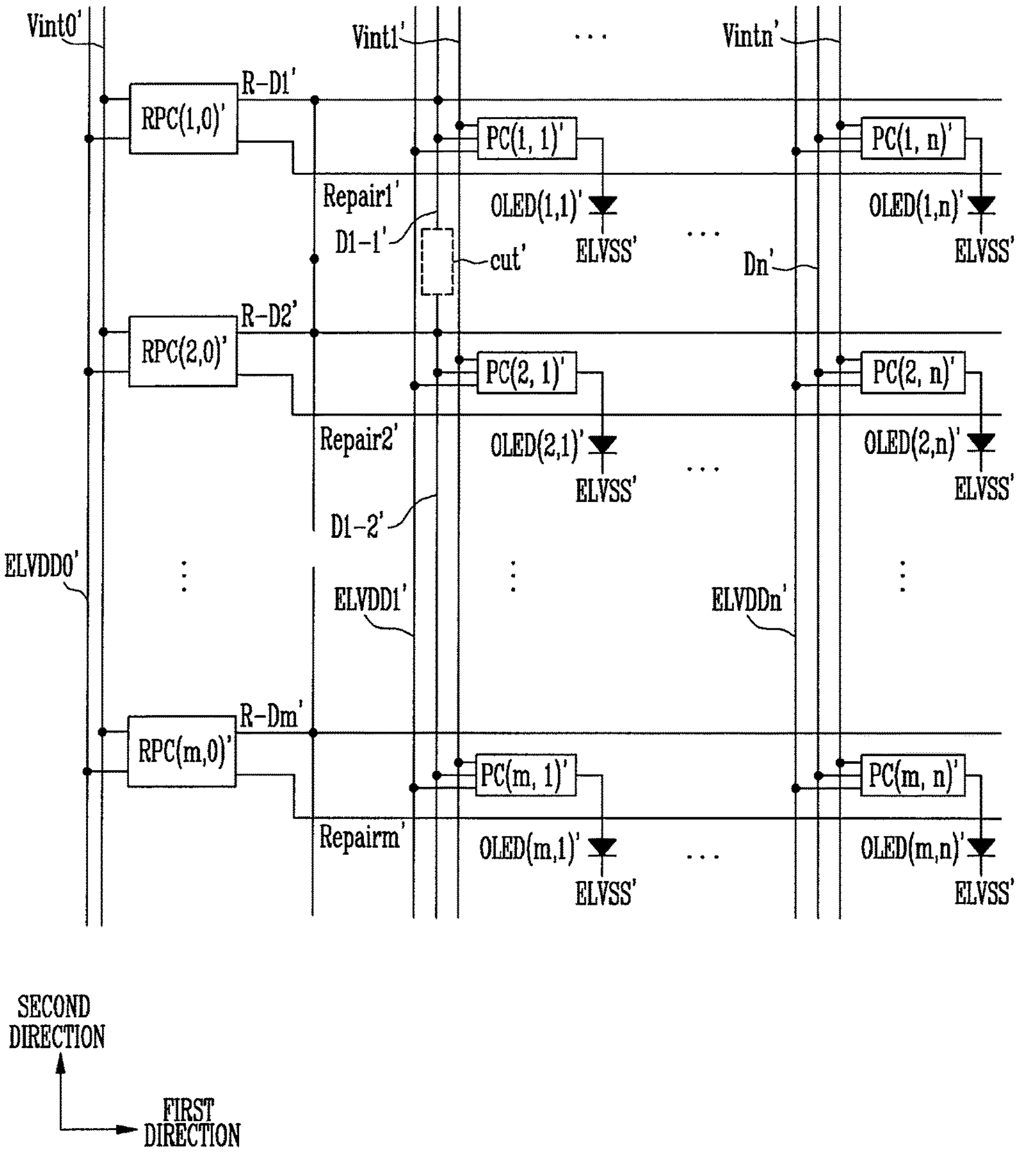
FIG. 5 illustrates a case in which one of data lines is cut in another embodiment of the display of FIG. 1.

In the embodiments illustrated in FIG. 4 and FIG. 5, repair data lines R-D1' to R-Dm' extending in the first direction are additionally formed, and the repair data lines R-D1' to R-Dm' include extension portions that extend in the second direction.

For the sake of convenient description, it is assumed that all of the data lines D1' to Dn' (hereinafter, referred to as data lines D') are not cut, and it is assumed that the pixel circuit PC(2,1)' malfunctions.

Thus, a repair pixel circuit RPC(2,0)' (hereinafter, referred to as a corresponding repair pixel circuit) corresponds to the malfunctioning pixel circuit PC(2,1)', and is among the repair pixel circuits RPC(1,0)' to RPC(m,0)' (hereinafter, referred to as RPC'), and a repair data line R-D2' (hereinafter, referred to as a corresponding repair data line) corresponds to the malfunctioning pixel circuit PC(2,1)', and is among the repair data lines R-D1' to R-Dm'. The repair data lines R-D1' to R-Dm' respectively correspond to the repair pixel circuits RPC(1,0)' to RPC(m,0)'.

In addition, a repair line Repair2' (hereinafter, referred to as a corresponding repair line) corresponds to the malfunctioning pixel circuit PC(2,1)', and is among the repair lines Repair1 to Repairm. An organic light emitting diode OLED (2,1)' (hereinafter, referred to as an organic light emitting diode) corresponds to the malfunctioning pixel circuit PC(2, 1)', and is among the organic light emitting diodes OLED (1,1)' to OLED(m,n)'. Additionally, a data line D1' (hereinafter, referred to as a corresponding data line) corresponds to the malfunctioning pixel circuit PC(2,1)', and is among the data lines D'.

The malfunctioning pixel circuit PC(2,1)' is electrically decoupled from the corresponding organic light emitting diode OLED(2,1)', and a drive current Idc' therefore does not flow from the pixel circuit PC(2,1)' to the organic light emitting diode OLED(2,1)', and malfunctioning pixel circuit PC(2,1)' might not generate the drive current Idc'.

The repair data line R-D2' is electrically coupled to the data line D1' through a process such as laser short, and thereby the repair pixel circuit RPC(2,0)' receives a repair data voltage Vrepair', which corresponds to a data voltage that is supplied to the data line D1'.

The repair pixel circuit RPC(2,0)' generates a repair drive current Irepair', and the repair line Repair2' is electrically coupled to the organic light emitting diode OLED(2,1)', and the repair drive current Irepair' is thereby supplied to the organic light emitting diode OLED(2,1)'. Here, a level of the repair drive current Irepair' corresponds to a level of the data voltage supplied to the data line D1'. That is, even if the pixel circuit PC(2,1)' malfunctions, the organic light emitting diode OLED(2,1)' receives the repair drive current Irepair' from the repair pixel circuit RPC(2,0)' to thereby emit light, due to electrical coupling and electrical decoupling.

While referring to FIG. 4, electrical decoupling, supplying of the repair data voltage Vrepair', and generating and supplying of the repair drive current Irepair' are sequentially described, although this is just an example used for the sake of description.

FIG. 5 illustrates a case in which one of the data lines is cut in another embodiment of the display of FIG. 1.

For the sake of convenient description, it may be assumed that all of the pixel circuits PC(1,1)' to PC(m,n)' normally operate, and only the data line D1' of the data lines D' is cut. In addition, it may be assumed that a cut portion Cut' is formed between the repair data line R-D1' and the repair data line R-D2', and it may be assumed that the data line D1' includes a first portion D1-1' and a second portion D1-2' that are cut from each other. Thus, the repair data line R-D1' and the repair data line R-D2' are coupled to each other. In the present embodiment, an extension portion of the repair data line R-D1' is electrically coupled to an extension portion of the repair data line R-D2'.

The repair data line R-D1' is electrically coupled to the first portion D1-1', and the repair data line R-D2' is electrically coupled to the second portion D1-2'. The electrical coupling may be made through a process such as laser short. According to the electrical coupling, the data voltage supplied from the first portion D1-1' is supplied to the second portion D1-2' through the repair data lines R-D1' and R-D2'. That is, even if the cut portion Cut' is formed, the data voltage may be supplied to an entirety of the data line D1' through the repair data lines R-D1' and R-D2'.

The display panel 100 may be manufactured such that the repair data lines R-D1' to R-Dm' are electrically coupled to each other within the display panel 100.

Figure 6:
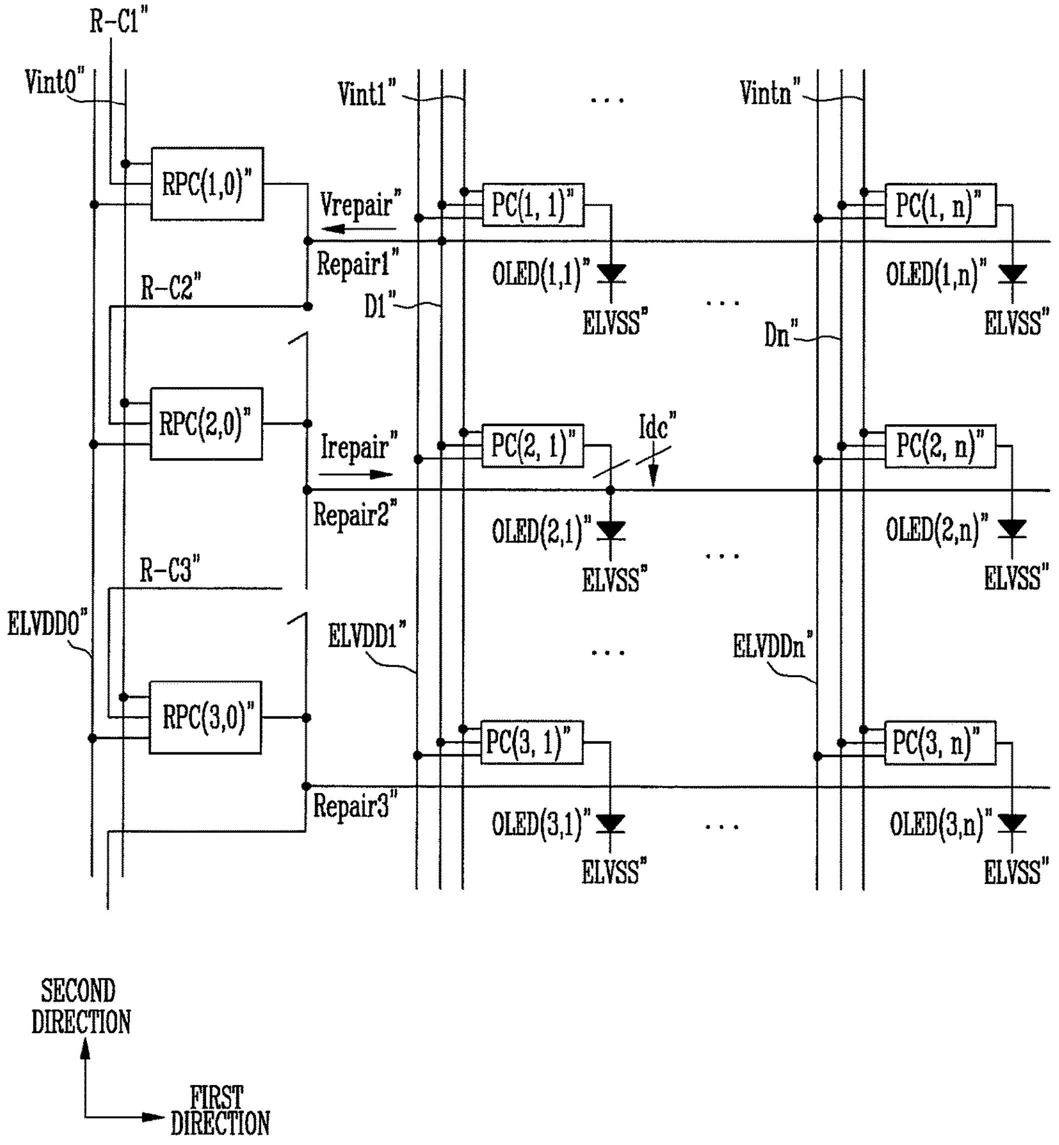
FIG. 6 illustrates a case in which one of pixels malfunctions in still another embodiment of the display of FIG. 1.

FIG. 6 illustrates a case in which one of the pixels malfunctions in still another embodiment of the display of FIG. 1.

For the sake of convenient description, only the pixel circuits PC(1,1)" to PC(3,*n*)" are illustrated among the pixel circuits, and only the organic light emitting diodes OLED (1,1)" to OLED(3,*n*)" are illustrated among the organic light emitting diodes. In addition, only the repair lines Repair1" to Repair3" are illustrated among the repair lines, and only the repair pixel circuits RPC(1,0)" to RPC(3,0)" are illustrated among all of the repair pixel circuits.

Figure 7:
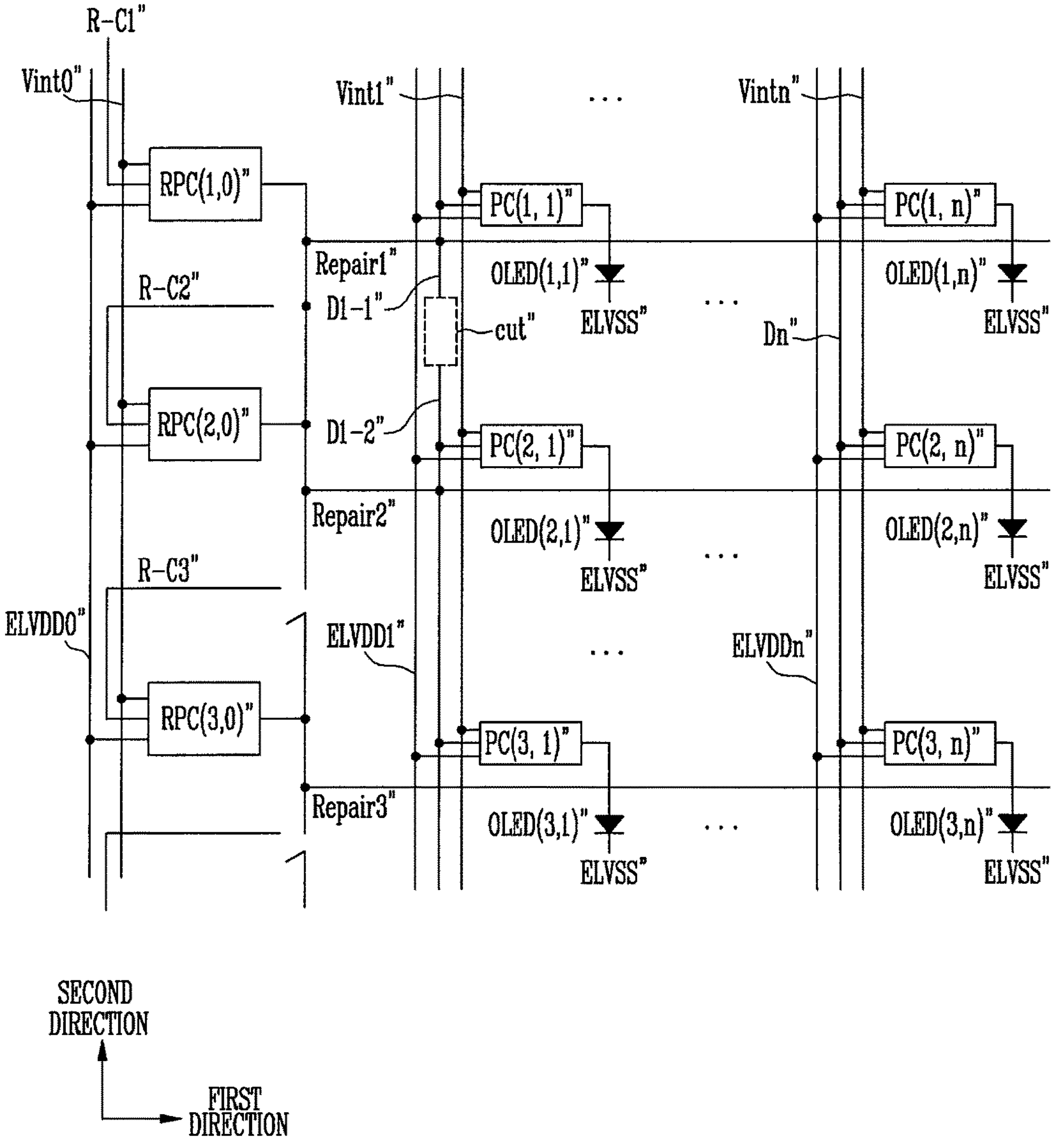
FIG. 7 illustrates a case in which one of data lines is cut in still another embodiment of the display of FIG. 1.

In the embodiments illustrated in FIG. 6 and FIG. 7, the repair lines Repair1" to Repair3" are repair data lines that extend in the first direction, and include extension portions that extend in the second direction. In addition, the repair pixel circuits RPC(1,0)" to RPC(3,0)" respectively include repair coupling lines R-C1" to R-C3".

In FIG. 6, for the sake of convenient description, it is assumed that all of the data lines D1" to Dn" are not cut, and that the pixel circuit PC(2,1)" malfunctions. Thus, a repair pixel circuit RPC(2,0)" (hereinafter, referred to as a corresponding repair pixel circuit) corresponds to a malfunctioning pixel circuit PC(2,1)", and is among the repair pixel circuits RPC(1,0)" to RPC(3,0)", and a repair line Repair2" (hereinafter, referred to as a corresponding repair line) corresponds to a malfunctioning pixel circuit PC(2,1)", and is among the repair lines Repair1" to Repair3". A repair data line Repair1" (hereinafter, referred to as a corresponding repair data line) corresponds to a malfunctioning pixel circuit PC(2,1)", is among the repair data lines Repair1" to Repair3", and is adjacent the repair line Repair2" in the second direction.

An organic light emitting diode OLED(2,1)" (hereinafter, referred to as a corresponding organic light emitting diode) corresponds to the malfunctioning pixel circuit PC(2,1)", and is among the organic light emitting diodes OLED(1,1)" to OLED(3,*n*)", and a data line D1" (hereinafter, referred to as a corresponding data line) corresponds to the malfunctioning pixel circuit PC(2,1)", and is among the data lines D1" to Dn".

The malfunctioning pixel circuit PC(2,1)" is electrically decoupled from the corresponding organic light emitting diode OLED(2,1)", and a drive current Idc" therefore does not flow from the pixel circuit PC(2,1)" to the organic light emitting diode OLED(2,1)", and the malfunctioning pixel circuit PC(2,1)", might not generate the drive current.

The repair line Repair1" is electrically coupled to the data line D1", and a repair coupling line R-C2" of the repair pixel circuit RPC(2,0)" is electrically coupled to an extension portion of the repair line Repair1", and the repair pixel circuit RPC(2,0)" is thereby able to receive a repair data voltage Vrepair". The repair data voltage Vrepair" corresponds to a data voltage supplied to the data line D1".

The repair pixel circuit RPC(2,0)" generates a repair drive current Irepair", and the repair line Repair2" is electrically coupled to the organic light emitting diode OLED(2,1)", and the repair drive current Irepair" is thereby able to be supplied to the organic light emitting diode OLED(2,1)". Here, a level of the repair drive current Irepair" is determined based on a level of the data voltage supplied to the data line D1". That is, even if the pixel circuit PC(2,1)" malfunctions, the organic light emitting diode OLED(2,1)" receives the repair drive current Irepair" from the repair pixel circuit RPC(2,0)" to thereby emit light, due to electrical coupling and electrical decoupling.

While referring to FIG. 6, electrical decoupling, supplying of the repair data voltage Vrepair", and generating and supplying of the repair drive current Irepair" are sequentially described, although the sequential order is a non-limiting example.

FIG. 7 illustrates a case in which one of the data lines is cut in still another embodiment of the display of FIG. 1.

For the sake of convenient description, it may be assumed that the pixel circuits PC(1,1)" to PC(3,*n*)" normally operate, and only the data line D1" of the data lines D" is cut. In addition, it may be assumed that a cut portion Cut" is formed between the repair line Repair1" and the repair line Repair2", and that the data line D1" thereby includes a first portion D1-1" and a second portion D1-2", which are electrically separated from each other. Thus, the repair line Repair1" and the repair line Repair2" are coupled to each other.

An extension portion of the repair line Repair1" is electrically coupled to an extension portion of the repair line Repair2". The repair line Repair1" is electrically coupled to the first portion D1-1", and the repair line Repair2" is electrically coupled to the second portion D1-2". The electrical coupling may be made through a process such as laser short. According to the electrical coupling, the data voltage supplied from the first portion D1-1" is supplied to the second portion D1-2" through the repair lines Repair1" and Repair2". That is, even if the cut portion Cut" is formed in the data line D1", the data voltage may be supplied to an entirety of the data line D1" through the repair lines Repair1" and Repair2".

Figure 8:
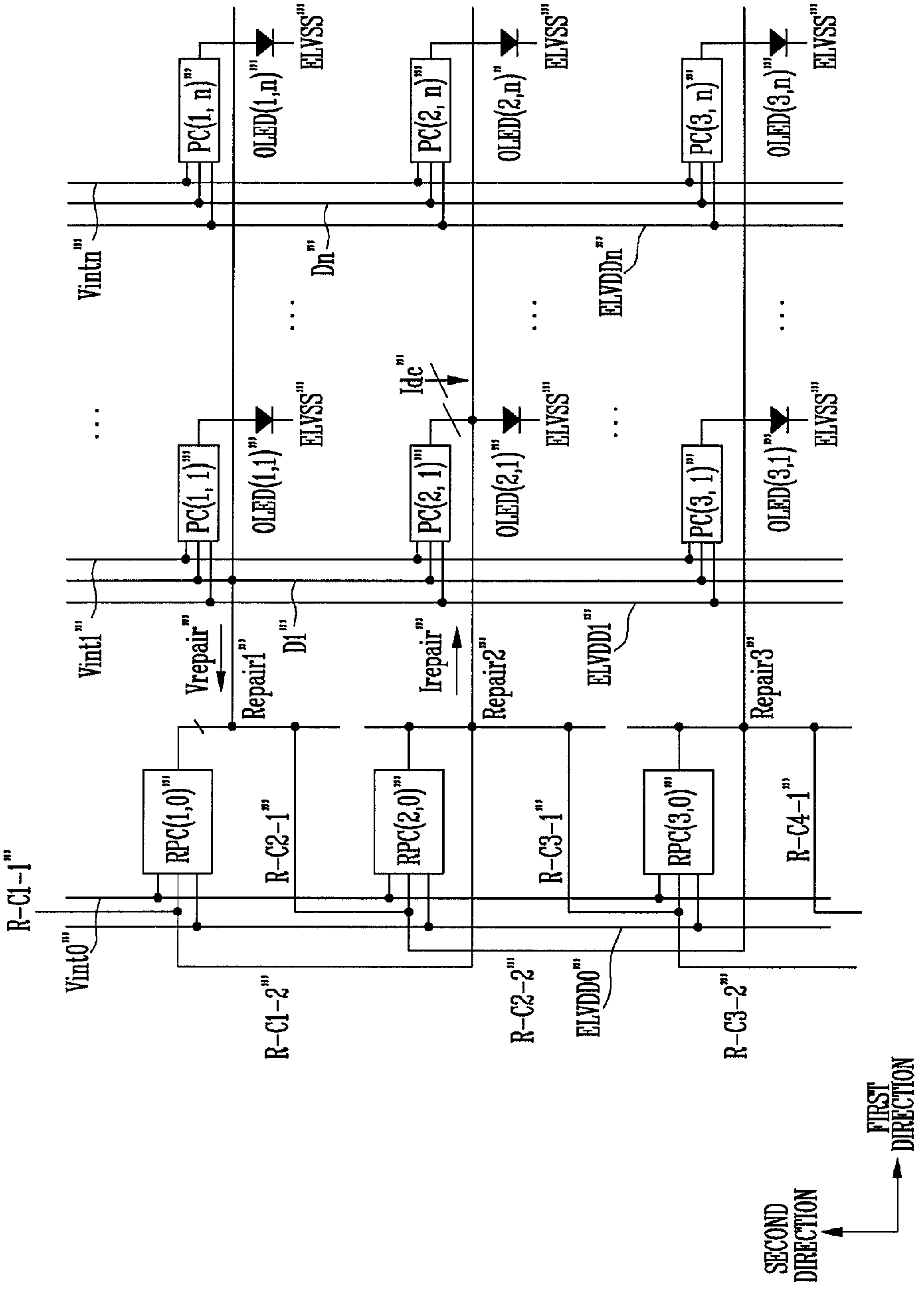
FIG. 8 illustrates a case in which one of pixels malfunctions in still another embodiment of the display of FIG. 1.

FIG. 8 illustrates a case in which one of the pixels malfunctions in still another embodiment of the display of FIG. 1.

For the sake of convenient description, only the pixel circuits PC(1,1)'" to PC(3,*n*)'" are illustrated among the pixel circuits, and only the organic light emitting diodes OLED (1,1)'" to OLED(3,*n*)'" are illustrated among the organic light emitting diodes. In addition, only the repair lines Repair1'" to Repair3'" are illustrated among the repair lines, and only the repair pixel circuits RPC(1,0)'" to Repair(3,0)'" are illustrated among the repair pixel circuits.

Figure 9:
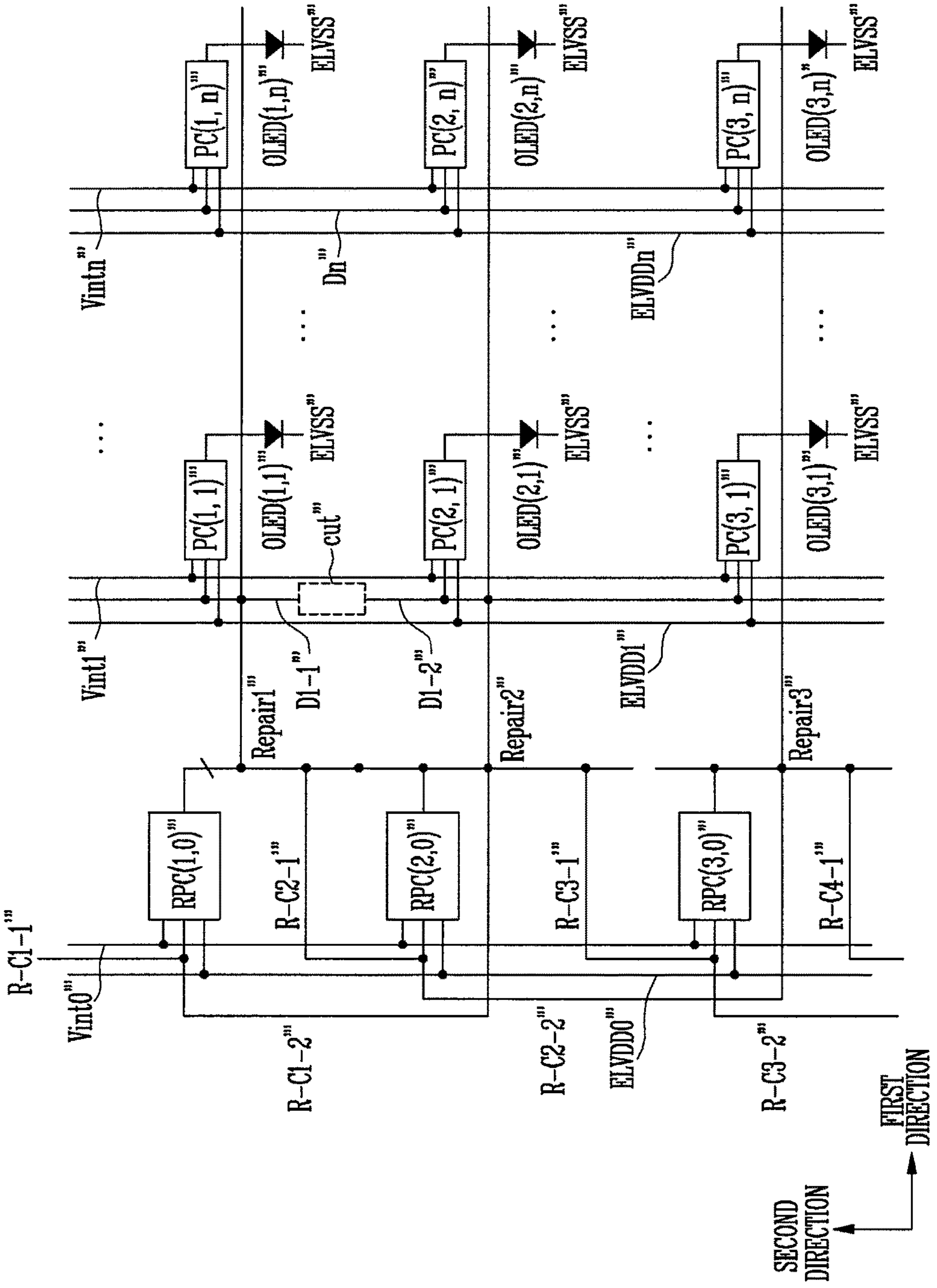
FIG. 9 illustrates a case in which one of data lines is cut in still another embodiment of the display of FIG. 1.

In the embodiments illustrated in FIG. 8 and FIG. 9, the repair lines Repair1'" to Repair3'" are repair data lines that extend in the first direction, and include extension portions that extend in the second direction. In addition, the repair pixel circuits RPC(1,0)'" to RPC(3,0)'" respectively include first repair coupling lines R-C1-1'" to R-C3-1'" and second repair coupling lines R-C1-2'" to R-C3-2'".

In FIG. 8, for the sake of convenient description, it is assumed that all of the data lines D1'" to Dn'" are not cut, and it is assumed that the pixel circuit PC(2,1)'" malfunctions.

Thus, a repair pixel circuit RPC(2,0)'" (hereinafter, referred to as a corresponding repair pixel circuit) corresponds to a malfunctioning pixel circuit PC(2,1)'", and is among the repair pixel circuits RPC(1,0)'" to RPC(3,0)'", and a repair line Repair2''' (hereinafter, referred to as a corresponding repair line) corresponds to the malfunctioning pixel circuit PC(2,1)''', and is among the repair lines Repair1''' to Repair3'''. A repair data line Repair1''' (hereinafter, referred to as a corresponding data line) corresponds to the malfunctioning pixel circuit PC(2,1)''', and is among the repair data lines Repair1'''' to Repair3''' is a first adjacent repair line Repair1''' that is adjacent the repair line Repair2''' in a second direction (e.g., the first adjacent repair line Repair1''' is above the repair line Repair2'''), or a repair line (hereinafter, referred to as a second adjacent repair line) Repair3''' is adjacent the repair line Repair2''' in a direction that is opposite to the second direction (e.g., the second adjacent repair line Repair3''' is below the repair line Repair2''').

An organic light emitting diode OLED(2,1)''' (hereinafter, referred to as a corresponding organic light emitting diode) corresponds to the malfunctioning pixel circuit PC(2,1)''', and is among the organic light emitting diodes OLED(1,1)''' to OLED(3,*n*)''', and a data line D1''' (hereinafter, referred to as a corresponding data line) corresponds to the malfunctioning pixel circuit PC(2,1)''', and is among the data lines D1''' to Dn'''.

The pixel circuit PC(2,1)''' is electrically decoupled from the organic light emitting diode OLED(2,1)''', and a drive current Idc''' is thereby unable to flow from the pixel circuit PC(2,1)''' to the organic light emitting diode OLED(2,1)''', and the malfunctioning pixel circuit PC(2,1)''' might not generate the drive current Idc'''.

The repair line Repair1''' is electrically coupled to the data line D1''', and a first repair coupling line R-C2-1''' of the repair pixel circuit RPC(2,0)''' is electrically coupled to an extension portion of the repair line Repair1'''. Accordingly, the repair pixel circuit RPC(2,0)''' is able to receive a repair data voltage Vrepair''', which corresponds to a data voltage supplied to the data line D1'''.

The repair pixel circuit RPC(2,0)''' generates a repair drive current Irepair''', and the repair line Repair2''' is electrically coupled to the organic light emitting diode OLED(2,1)''', and thereby the repair drive current Irepair''' is supplied to the organic light emitting diode OLED(2,1)'''. Here, a level of the repair drive current Irepair''' is determined based on a level of the data voltage supplied to the data line D1'''. That is, even if the pixel circuit PC(2,1)''' malfunctions, the organic light emitting diode OLED(2,1)''' receives the repair drive current Irepair from the repair pixel circuit RPC(2,0)''' to thereby emit light, due to electrical coupling and electrical decoupling.

In addition, The repair pixel circuit RPC(1,0)''' is electrically decoupled from the repair line Repair1'''. In FIG. 8, the repair line Repair1''' is otherwise electrically coupled to the data line D1''', but this is just an example.

For example, if the pixel circuit PC(1,1)''' also malfunctions, the repair line Repaid''' has to supply a drive current to the organic light emitting diode OLED(1,1)''', and thus the repair line Repair1''' cannot be coupled to the data line D1'''. In this case, the repair line Repair3''' is coupled to the data line D1''', and the second repair coupling line R-C2-2''' of the repair pixel circuit RPC(2,0)''' is electrically coupled to the extension portion of the repair line Repair3''', and thereby the repair pixel circuit RPC(2,0)''' is able to receive the repair data voltage Vrepair'''.

In a manufacturing process of the display panel 100, the second repair coupling line R-C2-2''' may be electrically decoupled from the repair line Repair3''', or may instead be coupled to the repair line Repair3'''.

On the contrary to this, if the pixel circuit PC(3,1)''' also malfunctions, the repair line Repair3''' may supply a drive current to the organic light emitting diode OLED(3,1)''', and thus the repair line Repair3'''' may be electrically decoupled from the data line D1'''. In this case, as illustrated in FIG. 8, the repair line Repair1''' may be electrically coupled to the data line D1''', and the first repair coupling line R-C2-1''' of the repair pixel circuit RPC(2,0)''' may be electrically coupled to the extension portion of the repair line Repair1'''. That is, even if the two pixel circuits that are adjacent each other in the second direction both malfunction, both pixel circuits can be repaired.

While referring to FIG. 8, electrical decoupling, supplying of the repair data voltage Vrepair''', and generating and supplying of the repair drive current Irepair''' are sequentially described, although the present invention is not limited thereto.

FIG. 9 illustrates a case in which one of the data lines is cut in still another embodiment of the display of FIG. 1.

For the sake of convenient description, it may be assumed that the pixel circuits PC(1,1)''' to PC(3,*n*)''' normally operate, and that only the data line D1''' of the data lines D''' is cut. In addition, it may be assumed that a cut portion Cut''' is formed between the repair line Repair1''' and the repair line Repair2''', and that the data line D1''' thereby includes a first portion D1-1''' and a second portion D1-2''' that are electrically cut from each other. Thus, the repair line Repair1''' and the repair line Repair2''' are coupled to each other, and an extension portion of the repair line Repair1''' is electrically coupled to an extension portion of the repair line Repair2'''. The repair line Repair1''' is electrically coupled to the first portion D1-1''', and the repair line Repair2''' is electrically coupled to the second portion D1-2'''. The electrical coupling may be made through a process such as laser short. According to the electrical coupling, the data voltage supplied from the first portion D1-1''' is supplied to the second portion D1-2''' through the repair lines Repair1''' and Repair2'''. That is, even if the cut portion Cut''' is formed, the data voltage may be supplied to an entirety of the data line D1''' via the repair lines Repair1''' and Repair2'''.

Figure 10:
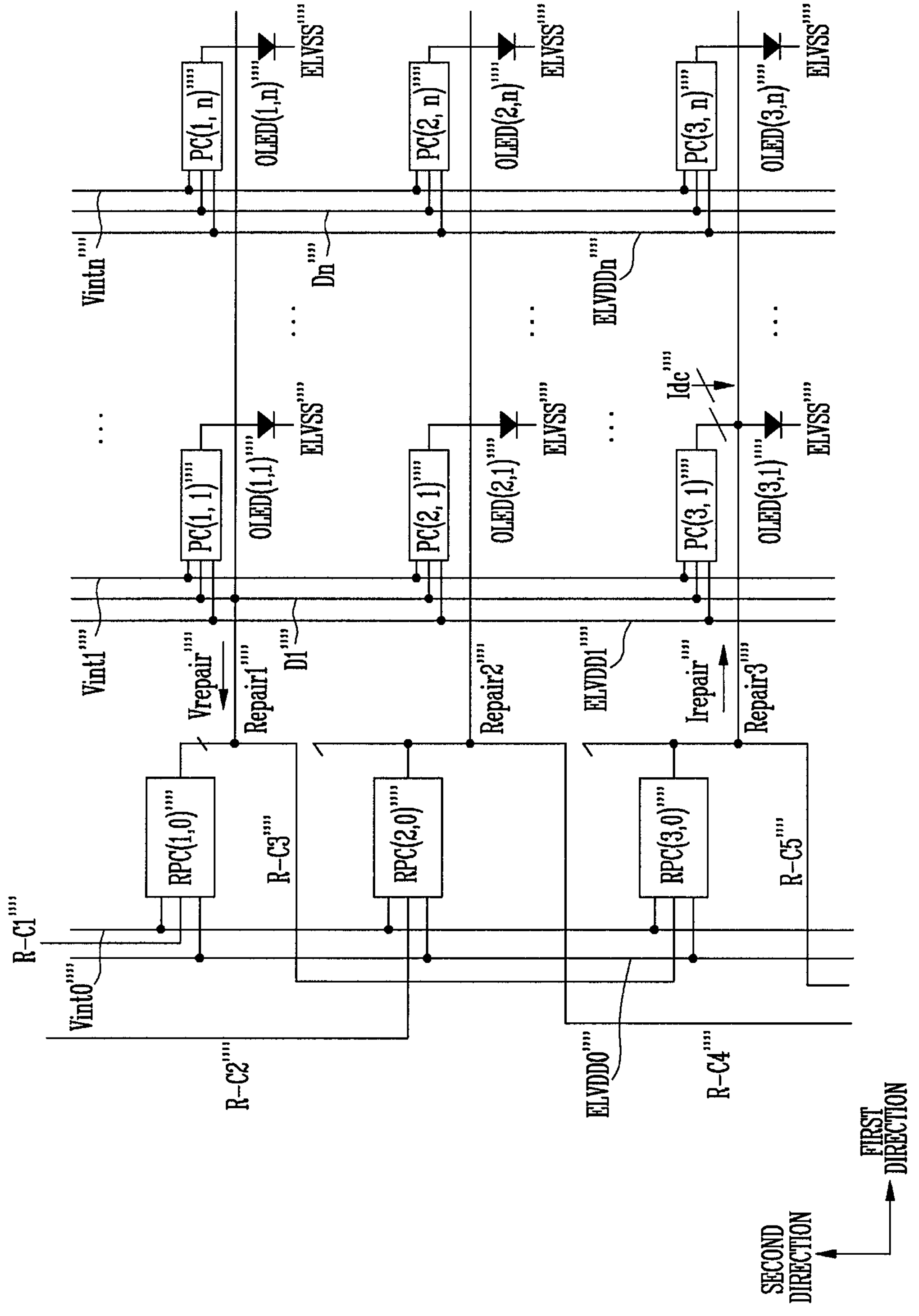
FIG. 10 illustrates a case in which one of pixels malfunctions in still another embodiment of the display of FIG. 1.

FIG. 10 illustrates a case in which one of the pixels malfunctions in still another embodiment of the display of FIG. 1.

For the sake of convenient description, only the pixel circuits PC(1,1)'''' to PC(3,*n*)'''' are illustrated among the pixel circuits, and only the organic light emitting diodes OLED(1,1)'''' to OLED(3,*n*)'''' are illustrated among the organic light emitting diodes. In addition, only the repair lines Repair1'''' to Repair3'''' are illustrated among the repair lines, and only the repair pixel circuits RPC(1,0)'''' to Repair(3,0)'''' are illustrated among the repair pixel circuits.

Figure 11:
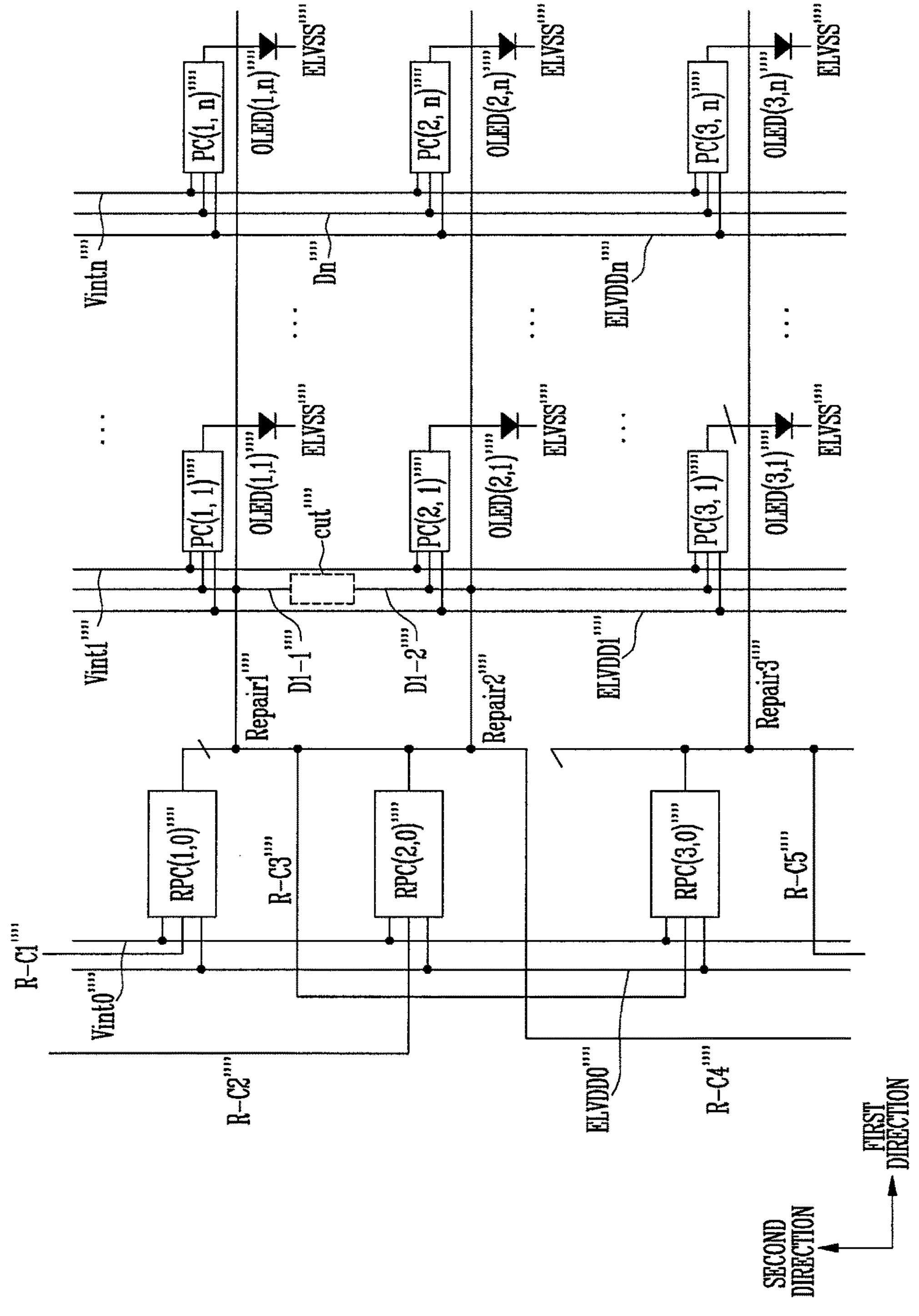
FIG. 11 illustrates a case in which one of data lines is cut in still another embodiment of the display of FIG. 1.

In the embodiments illustrated in FIG. 10 and FIG. 11, the repair lines Repair1'''' to Repair3'''' are repair data lines, and include extension portions which extend in the second direction. In addition, the repair pixel circuits RPC(1,0)'''' to RPC(3,0)'''' respectively include repair coupling lines R-C1'''' to R-C3''''.

In FIG. 10, for the sake of convenient description, it is assumed that all of the data lines D1'''' to Dn'''' are not cut, and that the pixel circuit PC(3,1)'''' malfunctions. Thus, a repair pixel circuit RPC(3,0)'''' (hereinafter, referred to as a corresponding repair pixel circuit) corresponds to a malfunctioning pixel circuit PC(3,1)'''' among the repair pixel circuits RPC(1,0)'''' to RPC(3,0)'''', and a repair line Repair3'''' (hereinafter, referred to as a corresponding repair line) corresponds to the malfunctioning pixel circuit PC(3, 1)"" among the repair lines Repair1"" to Repair3"".

A repair data line Repair1"" (hereinafter, referred to as a corresponding repair data line) corresponds to the malfunctioning pixel circuit PC(3,1)"" among the repair data lines Repair1"" to Repair3"", and is the repair line Repair1"" that is separated from the repair line Repair3"" in the second direction.

An organic light emitting diode OLED(3,1)"" (hereinafter, referred to as a corresponding organic light emitting diode) corresponds to a malfunctioning pixel circuit PC(3, 1)"", and is among the organic light emitting diodes OLED (1,1)"" to OLED(3,1)"", and a data line D1"" (hereinafter, referred to as a corresponding data line) corresponds to a malfunctioning pixel circuit PC(3,1)"", and is among the data lines D1"" to Dn"".

The pixel circuit PC(3,1)"" is electrically decoupled from the organic light emitting diode OLED(3,1)"", and a drive current Idc"" is therefore unable to flow from the pixel circuit PC(3,1)"" to the organic light emitting diode OLED (3,1)"". The malfunctioning pixel circuit PC(3,1)"" might not generate the drive current.

The repair line Repair1"" is electrically coupled to the data line D1"", a repair coupling line R-C3"" of the repair pixel circuit RPC(3,0)"" is electrically coupled to an extension portion of the repair line Repair1"", and thereby the repair pixel circuit RPC(3,0)"" is able to receive a repair data voltage Vrepair"", which corresponds to a data voltage supplied to the data line D1"".

The repair pixel circuit RPC(3,0)"" generates a repair drive current Irepair"", and the repair line Repair3"" is electrically coupled to the organic light emitting diode OLED(3,1)"", and thereby the repair drive current Irepair"" is supplied to the organic light emitting diode OLED(3,1)"". Here, a level of the repair drive current Irepair"" corresponds to a level of the data voltage supplied to the data line D1"". That is, even if the pixel circuit PC(3,1)"" malfunctions, the organic light emitting diode OLED(3,1)"" may receive the repair drive current Irepair"" from the repair pixel circuit RPC(3,0)"" to thereby emit light, due to electrical coupling and electrical decoupling.

Because the repair pixel circuit RPC(3,0)"" receives the repair data voltage Vrepair"" from the repair line Repair1"", which is arranged separately from the repair pixel circuit RPC(3,0)"" in the second direction, the repair line Repair3"" can supply the repair drive current Irepair"" to the organic light emitting diode OLED(3,1)"", even if the pixel circuits PC(2,1)"" and PC(3,1)"" malfunction.

While referring to FIG. 10, electrical decoupling, supplying of the repair data voltage Vrepair"", and generating and supplying of the repair drive current Irepair"" are sequentially described, although the sequential description is just an example.

FIG. 11 illustrates a case in which one of the data lines is cut in still another embodiment of the display of FIG. 1

For the sake of convenient description, it may be assumed that the pixel circuits PC(1,1)"" to PC(3,*n*)"" normally operate, and only the data line D1"" of the data lines D"" is cut. In addition, it may be assumed that a cut portion Cut"" is formed between the repair line Repair1"" and the repair line Repair2"", and thereby the data line D1"" includes a first portion D1-1"" and a second portion D1-2"", which are cut from each other. Thus, the repair line Repair1"" and the repair line Repair2"" are coupled to each other, as an extension portion of the repair line Repair1"" is electrically coupled to an extension portion of the repair line Repair2"", and as the repair line Repair1"" is electrically coupled to the first portion D1-1"", and the repair line Repair2"" is electrically coupled to the second portion D1-2"".

The electrical coupling may be made through a process such as laser short. According to the electrical coupling, the data voltage supplied from the first portion D1-1"" is also supplied to the second portion D1-2"" through the repair lines Repair1"" and Repair2"". That is, even if the cut portion Cut"" is formed, the data voltage may be supplied to all of the data line D1"" through the repair lines Repair1"" and Repair2"".

According to the display panel and a repair method thereof, in accordance with embodiments of the present disclosure, a repair data voltage may be supplied to a repair pixel circuit through lines that extend in a horizontal direction, In addition, according to the display panel and a repair method thereof, in accordance with embodiments of the present disclosure, a load may be reduced by short repair lines according to a repair data voltage supplied to repair pixel circuits through lines extending in the horizontal direction, even if the display panel is applied to an organic light emitting diode Example embodiments have been disclosed herein and although specific terms are employed, they are used and are to be interpreted in a generic and descriptive sense only and not for purpose of limitation. In some instances, as would be apparent to one of ordinary skill in the art as of the filing of the present application, features, characteristics and/or elements described in connection with a particular embodiment may be used singly or in combination with features, characteristics and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A display panel comprising:

a plurality of scan lines extending in a first direction;

a plurality of data lines extending in a second direction that crosses the first direction;

a plurality of organic light emitting diodes;

a plurality of pixel circuits respectively corresponding to the plurality of organic light emitting diodes, configured to respectively supply drive currents, and respectively electrically coupled to the plurality of scan lines and the plurality of data lines;

a plurality of repair pixel circuits configured to generate repair drive currents when there is a malfunctioning pixel circuit among the plurality of pixel circuits;

a plurality of repair lines; and a plurality of repair data lines, wherein a corresponding repair pixel circuit of the repair pixel circuits corresponds to the malfunctioning pixel circuit, and is configured to generate the repair drive current based on a repair data voltage from a corresponding repair data line of the plurality of repair data lines that corresponds to the malfunctioning pixel circuit, wherein the repair drive current is configured to be supplied to a corresponding organic light emitting diode of the plurality of organic light emitting diodes that corresponds to the malfunctioning pixel circuit through a corresponding repair line of the plurality of repair lines that corresponds to the malfunctioning pixel circuit, and wherein a length of a portion of the plurality of repair data lines that extends in the first direction is greater than a length of a portion that does not extend in the first direction.

2. The display panel of claim 1, wherein the malfunctioning pixel circuit is electrically decoupled from the corresponding organic light emitting diode, wherein the corresponding repair data line is electrically coupled to a corresponding data line of the plurality of data lines that corresponds to the malfunctioning pixel circuit, wherein the corresponding repair pixel circuit is configured to receive the repair data voltage, wherein the corresponding repair line is electrically coupled to the corresponding organic light emitting diode, and wherein the repair drive current is configured to be supplied to the corresponding organic light emitting diode.

3. The display panel of claim 1, wherein each of the repair lines generally extends in the first direction, and further comprises an extension portion extending in the second direction, wherein, when there is a cut data line of the plurality of data lines, extension portions of two adjacent coupling repair lines of the plurality of repair lines are electrically coupled to a respective one of two cut portions of the cut data line, and wherein a voltage supplied to either of the two cut portions is also supplied to the other of the two cut portions through the two adjacent coupling repair lines.

4. The display panel of claim 1, wherein each of the repair data lines generally extends in the first direction, and further comprises an extension portion extending in the second direction, wherein, when there is a cut data line among the plurality of data lines, extension portions of two adjacent coupling repair data lines of the data lines are electrically coupled to a respective one of two cut portions of the cut data line, and wherein a voltage supplied to either of the two cut portions is also supplied to the other of the two cut portions through the two adjacent coupling repair data lines.

5. The display panel of claim 1, wherein the plurality of repair data lines comprises a plurality of repair lines, wherein each repair pixel circuit further comprises a repair coupling line, and wherein the corresponding repair data line is adjacent the corresponding repair line in the second direction.

6. The display panel of claim 5, wherein the corresponding repair data line is electrically coupled to a corresponding data line of the data lines that corresponds to the malfunctioning pixel circuit, wherein the corresponding repair line is electrically coupled to a corresponding repair coupling line of the repair coupling lines that corresponds to the corresponding repair pixel circuit, wherein the corresponding repair pixel circuit is configured to receive the repair data voltage, wherein the malfunctioning pixel circuit is electrically decoupled from the corresponding organic light emitting diode, and wherein the corresponding repair line is electrically coupled to the corresponding organic light emitting diode.

7. The display panel of claim 5, wherein each of the repair lines generally extends in the first direction, and further comprises an extension portion extending in the second direction, wherein, when there is a cut data line among the plurality of data lines, extension portions of two adjacent coupling repair lines among the repair lines are electrically coupled to a respective one of two cut portions of the cut data line, and wherein a voltage that is supplied to either of the two cut portions is also supplied to the other of the two cut portions via the two adjacent coupling repair lines.

8. The display panel of claim 1, wherein the plurality of repair data lines comprises a plurality of repair lines, wherein each repair pixel circuit further comprises a first repair coupling line and a second repair coupling line, and wherein the corresponding repair data line is a first adjacent repair line that is adjacent the corresponding repair line in the second direction, or is a second adjacent repair line that is adjacent the corresponding repair line in a direction that is opposite to the second direction.

9. The display panel of claim 8, wherein, when a first adjacent pixel among the plurality of pixels that is adjacent the malfunctioning pixel circuit in the second direction malfunctions, the corresponding repair data line is the second adjacent repair line, and wherein, when a second adjacent pixel among the plurality of pixels that is adjacent the malfunctioning pixel circuit in a direction that is opposite to the second direction malfunctions, the corresponding repair data line is the first adjacent repair line.

10. The display panel of claim 8, wherein the first adjacent repair line or the second adjacent repair line is electrically coupled to a corresponding data line of the data lines that corresponds to the malfunctioning pixel circuit, wherein the first adjacent repair line or the second adjacent repair line is electrically coupled to a first repair coupling line or a second repair coupling line of the corresponding repair pixel circuit, wherein the corresponding repair pixel circuit is configured to receive the repair data voltage, wherein the malfunctioning pixel circuit is electrically decoupled from the corresponding organic light emitting diode, wherein the corresponding repair line is electrically coupled to the corresponding organic light emitting diode, and wherein the repair drive current is configured to be supplied to the corresponding organic light emitting diode.

11. The display panel of claim 8, wherein each of the repair lines generally extends in the first direction, and further comprises an extension portion extending in the second direction, wherein, when there is a cut data line among the plurality of data lines, extension portions of two adjacent coupling repair lines are electrically coupled to a respective one of two cut portions of the cut data line, and wherein a voltage supplied to either of the two cut portions is also configured to be supplied to the other of the two cut portions via the coupling repair lines.

12. The display panel of claim 1, wherein the plurality of repair data lines comprise the plurality of repair lines, wherein each repair pixel circuit further comprises a repair coupling line, wherein the corresponding repair data line is a separately disposed repair line among the plurality of repair lines that is separated from the corresponding repair line in the second direction, and wherein at least one repair line of the repair lines is between the corresponding repair line and the separately disposed repair line.

13. The display panel of claim 12, wherein the separately disposed repair line is electrically coupled to a corresponding data line of the data lines that corresponds to the malfunctioning pixel circuit, wherein the separately disposed repair line is electrically coupled to the repair coupling line of the corresponding repair pixel circuit, wherein the corresponding repair pixel circuit is configured to receive the repair data voltage, wherein the malfunctioning pixel circuit is electrically decoupled from the corresponding organic light emitting diode, wherein the corresponding repair line is electrically coupled to the corresponding organic light emitting diode, and wherein the repair drive current is configured to be supplied to the corresponding organic light emitting diode.

14. The display panel of claim 12, wherein each of the repair lines further comprises an extension portion extending in the second direction, wherein, when there is a cut data line among the plurality of data lies, extension portions of two adjacent corresponding repair lines are electrically coupled to a respective one of two cut portions of the cut data line, and wherein a voltage that is supplied to either of the two cut portions is also configured to be supplied to the other of the two cut portions via the coupling repair lines.

15. A repair method of a display panel comprising a plurality of scan lines extending in a first direction, a plurality of data lines extending in a second direction that crosses the first direction, a plurality of organic light emitting diodes, a plurality of pixel circuits that respectively correspond to the plurality of organic light emitting diodes, that are configured to respectively supply drive currents, and that are respectively electrically coupled to the plurality of scan lines and the plurality of data lines, a plurality of repair pixel circuits configured to generate repair drive currents when there is a malfunctioning pixel circuit among the plurality of pixel circuits, and a plurality of repair lines which extend in the first direction, the method comprising:

electrically decoupling the malfunctioning pixel circuit from a corresponding organic light emitting diode among the plurality of organic light emitting diodes that corresponds to the malfunctioning pixel circuit;

supplying a repair data voltage to a corresponding repair pixel circuit among the plurality of repair pixel circuits that corresponds to the malfunctioning pixel circuit;

generating a repair drive current based on the repair data voltage; and supplying the repair drive current to the corresponding organic light emitting diode through a corresponding repair line among the plurality of repair lines that corresponds to the malfunctioning pixel circuit.

16. The repair method of a display panel of claim 15, wherein the display panel further comprises a plurality of repair data lines respectively electrically coupled to the plurality of repair pixel circuits, and wherein, during supplying of the repair data voltage to the corresponding repair pixel circuit, a corresponding repair data line is electrically coupled to the corresponding repair pixel circuit and is electrically coupled to a corresponding data line among the plurality of data lines that corresponds to the malfunctioning pixel circuit.

17. The repair method of a display panel of claim 15, wherein, during supplying the repair data voltage to the corresponding repair pixel circuit, one of the repair lines other than the corresponding repair line among the plurality of repair lines is electrically coupled to a corresponding data line among the plurality of data lines that corresponds to the malfunctioning pixel circuit.

18. The repair method of a display panel of claim 17, wherein, during supplying the repair data voltage to the corresponding repair pixel circuit:

when a pixel adjacent the malfunctioning pixel circuit in the second direction malfunctions, a repair line adjacent to the corresponding repair line in a direction opposite to the second direction is electrically coupled to the corresponding data line, and when a pixel adjacent the malfunctioning pixel circuit in the direction opposite to the second direction malfunctions, a repair data line adjacent the corresponding repair line in the second direction is electrically coupled to the corresponding data line.

19. A repair method of a display panel comprising a plurality of scan lines extending in a first direction, a plurality of data lines extending in a second direction crossing the first direction, a plurality of organic light emitting diodes, a plurality of pixel circuits that respectively correspond to the plurality of organic light emitting diodes, that are configured to respectively supply drive currents, and that are electrically coupled to the plurality of data lines, a plurality of repair pixel circuits that are configured to generate repair drive currents when there is a malfunctioning pixel circuit among the plurality of pixel circuits, and a plurality of repair lines extending in the first direction, the method comprising:

respectively electrically coupling two adjacent coupling repair lines among the plurality of repair lines to a respective one of two cut portions of a cut data line among the plurality of data lines.

* * * * *